United States Patent [19]

Yasunaga

[11] 4,014,039

[45] Mar. 22, 1977

[54] AUTOMATIC PROGRAM LOCATOR FOR TAPE DECKS

[75] Inventor: Tatsuhiro Yasunaga, Higashihiroshima, Japan

[73] Assignee: Sharp Kabushiki Kaisha, Osaka, Japan

[22] Filed: Apr. 24, 1975

[21] Appl. No.: 571,411

[30] Foreign Application Priority Data

Apr. 24, 1974 Japan .............................. 49-61056

[52] U.S. Cl. ........................ 360/72; 179/100.1 VC; 360/74

[51] Int. Cl.² .................. G11B 27/24; G11B 15/18; G11B 15/02

[58] Field of Search .................. 360/72, 74, 75, 78, 360/71, 137, 12–13; 353/25; 179/100.1 VC, 100.1 PS

[56] References Cited

UNITED STATES PATENTS

| | | | |
|---|---|---|---|
| 3,541,271 | 11/1970 | Joslow et al. | 360/72 |
| 3,723,666 | 3/1973 | Ferrari | 360/72 |
| 3,727,203 | 4/1973 | Crossman | 360/72 |
| 3,890,639 | 6/1975 | O'Donnel | 360/74 |
| 3,893,177 | 7/1975 | Takenaka | 360/72 |
| 3,903,369 | 9/1975 | Darwood | 360/72 |

Primary Examiner—Alfred H. Eddleman
Attorney, Agent, or Firm—Birch, Stewart, Kolasch & Birch

[57] ABSTRACT

The present disclosure relates to tape decks having a detection system responsive to a silence between recorded programs. A key board panel is provided for inputting a desired number to a down counter in order to position a head of a program after skipping a desired number of programs recorded on the tape at the fast movement speed. The count of the down counter is decremented once for every occurence of a detection signal from the detection system representative of the silence between recorded passages. The tape drive is stopped or returned to its normal playback speed when the contents of the down counter become zero.

10 Claims, 3 Drawing Figures

4,014,039

AUTOMATIC PROGRAM LOCATOR FOR TAPE DECKS

BACKGROUND AND SUMMARY OF THE INVENTION

The present invention relates to an automatic program locating system for tape decks for skipping a desired number of programs recorded on the tape at the fast movement speed and going on to the program following the desired number of programs.

Program head positioning systems responsive to a silence between recorded programs on a tape during fast movement of the tape have been proposed. For example, U.S. Pat. No. 3,665,117, to Theophiel Clement Jozef Lodewijk Staar entitled TAPE CARTRIDGE APPARATUS INCLUDING A SILENCE RESPONSIVE POSITIONING CONTROL, issued on May 23, 1972, and the U.S. Pat. No. 3,723,666, to Leonard A. Ferrari entitled METHOD FOR DISTINGUISHING PAUSES IN RECORDED FEATURES DURING REPLAY THEREOF, issued on Mar. 27, 1973 illustrate systems of this type.

The program head positioning systems of the prior art are responsive to a silence between recorded passages on the tape during fast movement of the tape and cause the tape drive to stop or shift to its normal playback speed when only one silence between recorded passages is detected. When it is desired to skip more than one of the programs recorded on the tape, the operator must repeat the introduction of the command to position the head of the following program until the head of the desired program is positioned at the playback head. This results in a time consuming and troublesome process. Accordingly, an object of the present invention is to provide a novel automatic program locator for tape decks.

Another object of the present invention is to provide an automatic program head positioning system suitable for positioning a head of a desired program recorded on a tape at a playback head after skipping one or more programs recorded on the tape at a fast movement speed.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objectives, pursuant to the present invention, there is provided a down counter and a key board panel for introducing and storing a desired number corresponding to a desired number of programs which should be skipped at a fast movement speed. The contents of the down counter are decreased once for every occurence of a detection signal representative of the silence between recorded passages from a silence detection system which can be of a conventional construction. The tape drive is stopped or shifted to its normal playback speed when the contents of the down counter become zero after passing the desired number of programs. An indication unit is preferrably provided for indicating the contents of the down counter, thereby enabling the operator to confirm the operation of the automatic program locator of the present invention.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

The present invention will be described in greater detail with reference to an embodiment wherein a head of a desired program recorded on a music tape, on which plural programs are recorded, is positioned at a playback head after skipping one or more programs at the fast movement speed.

Figure 1:
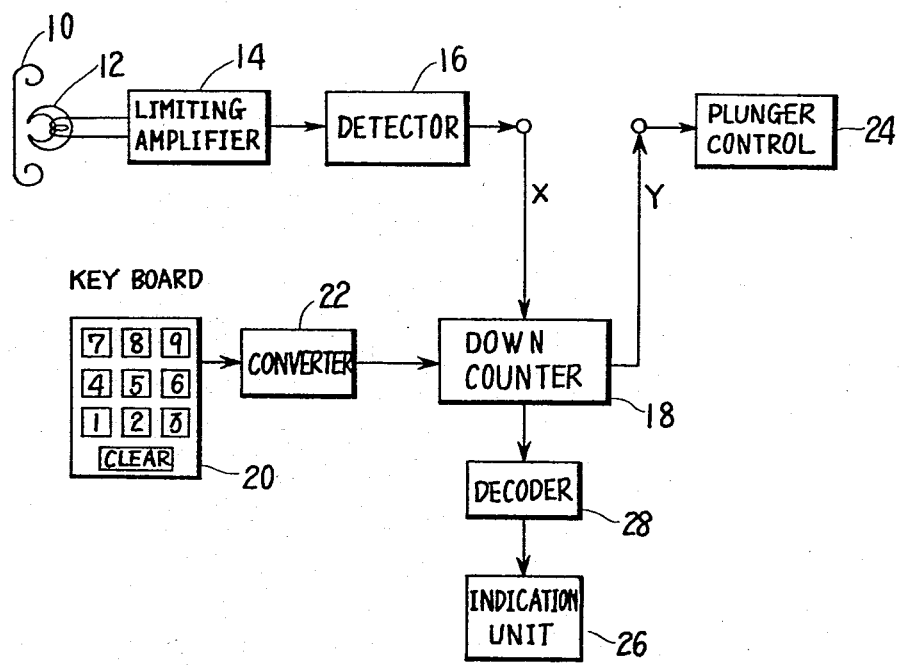
FIG. 1 is a schematic circuit diagram of an automatic program locator of the present invention.

FIG. 1 shows an automatic program locating system for tape decks of the present invention. A sensing head 12 is in physical contact with a music tape 10 on which several programs are recorded, when the tape deck is in the fast forward or rewind drive mode. Output signals of the sensing head 12 are introduced to a limiting amplifier 14 and amplified to produce amplified signals of a predetermined amplitude. The amplified signals are applied to a recorded passage detection circuit 16 which outputs a pulse signal X to a presettable decade down counter 18 for every detection of the silence between recorded programs. The initial count of the presettable decade down counter 18 is preset by a key board panel 20 through a converter 22. The key board panel 20 comprises numeral keys for introducing a desired number to the presettable decade down counter 18, and a clear key for resetting the presetted count. The count of the presettable decade down counter 18 is decremented once for occurence of the pulse signal X. The presettable decade down counter 18 generates a pulse signal Y when the count of the presettable decade down counter 18 becomes zero. The pulse signal Y is applied to a plunger control 24 such that the tape drive is stopped or returned to its normal playback speed when the count of the presettable decade down counter 18 becomes zero. An indication unit 26 is connected with the presettable decade down counter 18 through a decoder 28 in order to indicate the contents of the presettable decade down counter 18, thereby enabling the operator to confirm the operation of the automatic program locating system.

Figure 2:
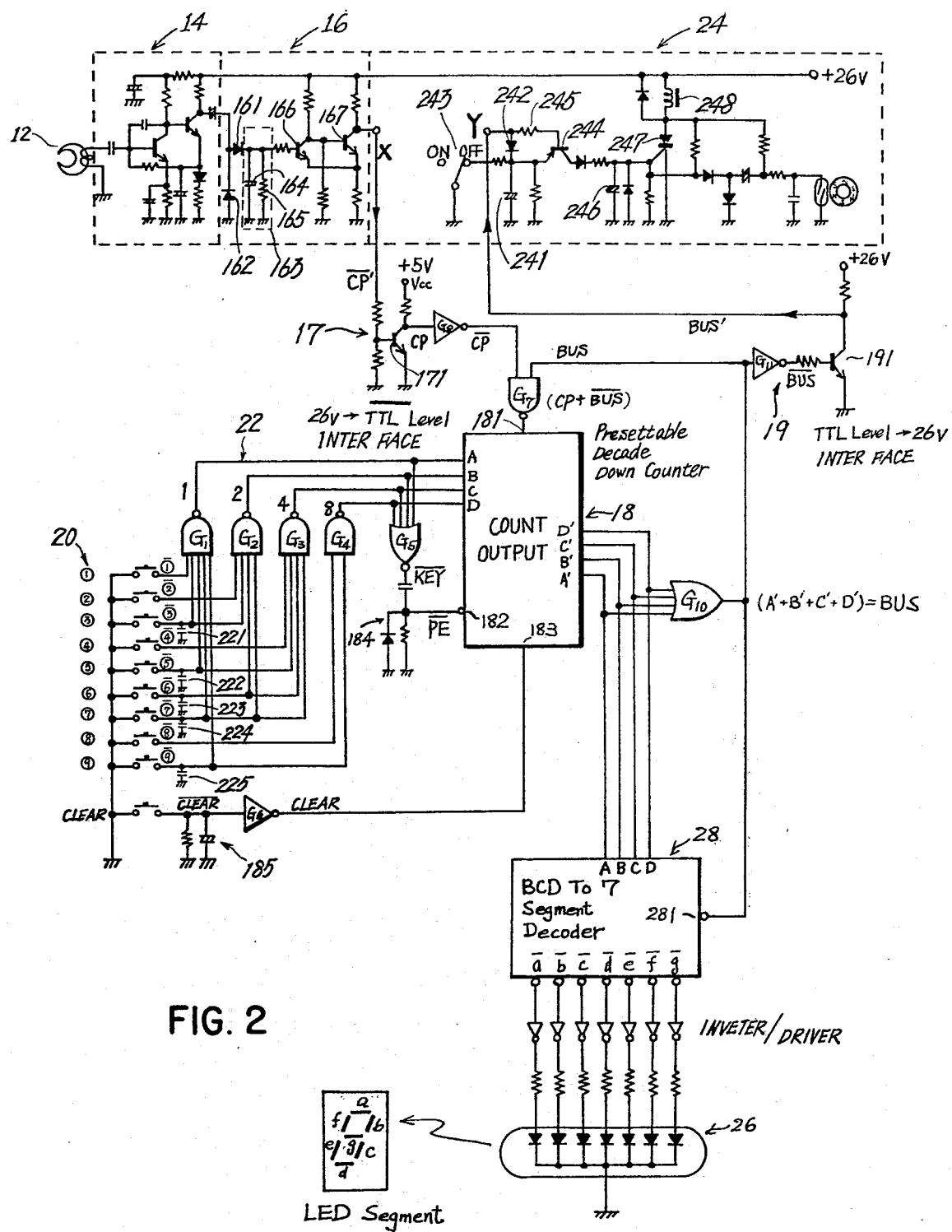
FIG. 2 is a detailed circuit diagram of the automatic program locator of FIG. 1.

FIG. 2 typically shows a detailed circuit diagram of the automatic program locating system of FIG. 1. The sensing head 12 is in physical contact with the music tape 10 (see FIG. 1) when the tape deck is in the fast forward or rewind drive mode. The amplified signals from the limiting amplifier 14 are rectified by the diodes 161 and 162. The rectified signals are applied to a time constant circuit 163 comprising a capacitor 164 and a resistor 165. It will be noted that in this example the discharge time constant of the time constant circuit 163 is longer than a period of any rest in the music but shorter than the period of silence between recorded programs, for example, one second. The charge on the capacitor 164 renders a transistor 166 ON and another transistor 167 OFF. Therefore, the output signal X of the recorded passage detection circuit 16 bears a high level, about + 26V, when the sensing head 12 is in physical contact with the recorded portion. When the sensing head 12 reaches a silence portion between recorded programs, the charge on the capacitor 164 is discharged through the resistor 165. Therefore, the transistor 166 is turned OFF and hence the transistor 167 is turned ON. This results in that the voltage level of the output signal X becomes low, approximately zero volts.

The output signal X is applied to the presettable decade down counter 18 through a first interface 17 and an inhibition gate $G_7$. The first interface 17 comprises a transistor 171 and an inverter $G_8$. When the output signal X is at the high level, the transistor 171 is ON and hence a signal $\overline{CP}$ from the inverter $G_8$ is at a high level. Conversely, when the output signal X is at the low level, the transistor 171 is OFF and hence the signal $\overline{CP}$ is at a low level.

The presettable decade down counter 18 can be of a conventional construction and includes a down count input terminal 181 connected to receive a signal from the inhibition gate $G_7$, preset input terminals A, B, C and D, a key depression indicating signal input terminal 182, a clear signal input terminal 183, and count output terminals A', B', C' and D'.

The preset input terminals A, B, C and D are connected to receive a binary-coded decimal information corresponding to a depressed numeral key on the key board panel 20 through the converter 22 including NAND gates $G_1$, $G_2$, $G_3$ and $G_4$. A NOR gate $G_5$ provides a $\overline{KEY}$ signal which bears a low level upon depression of any one of numeral keys ①-⑨. The $\overline{KEY}$ signal is differentiated by a differentiation circuit 184 to provide a key depression indicating signal $\overline{PE}$ which will be applied to the key depression indicating signal input terminal 182. The key depression indicating signal $\overline{PE}$ bears a low level at the time when the $\overline{KEY}$ signal changes from its high level to its low level. The presettable decade down counter 18 is so constructed that the binary-coded decimal information can be read in only when the key depression indicating signal $\overline{PE}$ is at its low level, thereby preventing an erroneous introduction of the preset information. Chattering preventing capacitors 221, 222, 223, 224 and 225 are connected with the key switches ③, ⑤, ⑥, ⑦ and ⑨, respectively, to prevent an erroneous introduction of the numeral information as is well known in the art.

The clear key (CLEAR) is connected with the clear signal input terminal 183 through an inverter $G_6$. The count of the presettable decade down counter 18 is cleared and hence all of the count output terminals A', B', C' and D' provide O signals upon depression of the clear key (CLEAR). An auto-clear circuit 185 is provided at the input site of the inverter $G_6$ in order to automatically clear the count of the presettable decade down counter upon throw of the power switch (not shown).

The indication unit 26 can be a conventional indication unit such as a segment shaped LED indication unit. The count of the presettable decade down counter is indicated by the indication unit 26 through the count output terminals A', B', C' and D' and the decoder 28. The decoder 28 can be of a conventional construction and comprises input terminals A, B, C and D connected with the count output terminals A', B', C' and D' of the presettable decade down counter 18, output terminals $\overline{a}$, $\overline{b}$, $\overline{c}$, $\overline{d}$, $\overline{e}$, $\overline{f}$ and $\overline{g}$ providing output signals for the indication unit 26, and a blanking input terminal 281. An OR gate $G_{10}$ is connected with the count output terminals A', B', C' and D' in order to determine whether the count of the presettable decade down counter 18 is zero. The output signal of the OR gate $G_{10}$, which will be referred to as BUS hereinafter, is at its high level when the count of the presettable decade down counter 18 is not zero. The blanking input terminal 281 of the decoder 28 is connected to receive the inversion of the BUS signal, thereby extinguishing the indication when the contents of the presettable decade down counter 18 is zero, or the automatic program locating operation is completed.

The BUS signal is also applied to a second interface 19 comprising an inverter $G_{11}$ and a transistor 191. An output signal BUS' of the second interface 19, which is identical with the aforementioned pulse signal Y, is at its high level when the BUS signal bears the high level, and is at its low level when the BUS signal bears the low level or the count of the presettable decade down counter 18 becomes zero. The output signal BUS' is applied to a capacitor 241 through a diode 242 within the plunger control 24. When an APL switch 243 is ON and the output signal BUS' is at its high level, the capacitor 241 is charged through the diode 242. The charged voltage is supplied to the emitter of a transistor 244. Since the base of the transistor 244 is connected via a resistor 245 to receive the output signal BUS', the base-emitter path of the transistor 244 is reverse biased due to forward voltage drop in the diode 242 and thus the transistor 244 held OFF. When the count of the presettable decade down counter 18 becomes zero and hence the output signal BUS' bears its low level, the charge on the capacitor 241 causes the transistor 244 to turn ON. The discharge current of the capacitor 241 through the transistor 244 charges another capacitor 246. When the charge voltage across the capacitor 246 reaches the threshold level of an SCR 247, the SCR 247 is turned ON with the results that current flow passes through a plunger 248 and the recorder apparatus is led to the stop mode or the normal playback mode. Such a plunger control is described in detail in copending application, AUTOMATIC PROGRAM FINDER SYSTEM FOR TAPE DECKS, Ser. No. 394,532, filed Sept. 5, 1973 by Takashi Takenaka and assigned to the same assignee as the present application, which is now U.S. Pat. No. 3,893,177.

The BUS signal is also applied to the afor mentioned inhibition gate $G_7$ in order to prevent an undesirable counting in of the presettable decade down counter. When the count of the presettable decade down counter 18 becomes zero, the plunger 248 is enabled and, therefore, a noise is unavoidably generated. Since at this time the BUS signal bears the low level, the noise can not be introduced to the presettable decade down counter. Moreover, the output X from the recorded passage detection circuit 16 cannot be introduced to the presettable decade down counter 18 after the count of the presettable decade down counter 18 becomes zero.

The above-mentioned presettable decade down counter 18 and the decoder 28 can be constructed by the HD2541P and HD2532P manufactured by HITACH Ltd., respectively.

Figure 3:
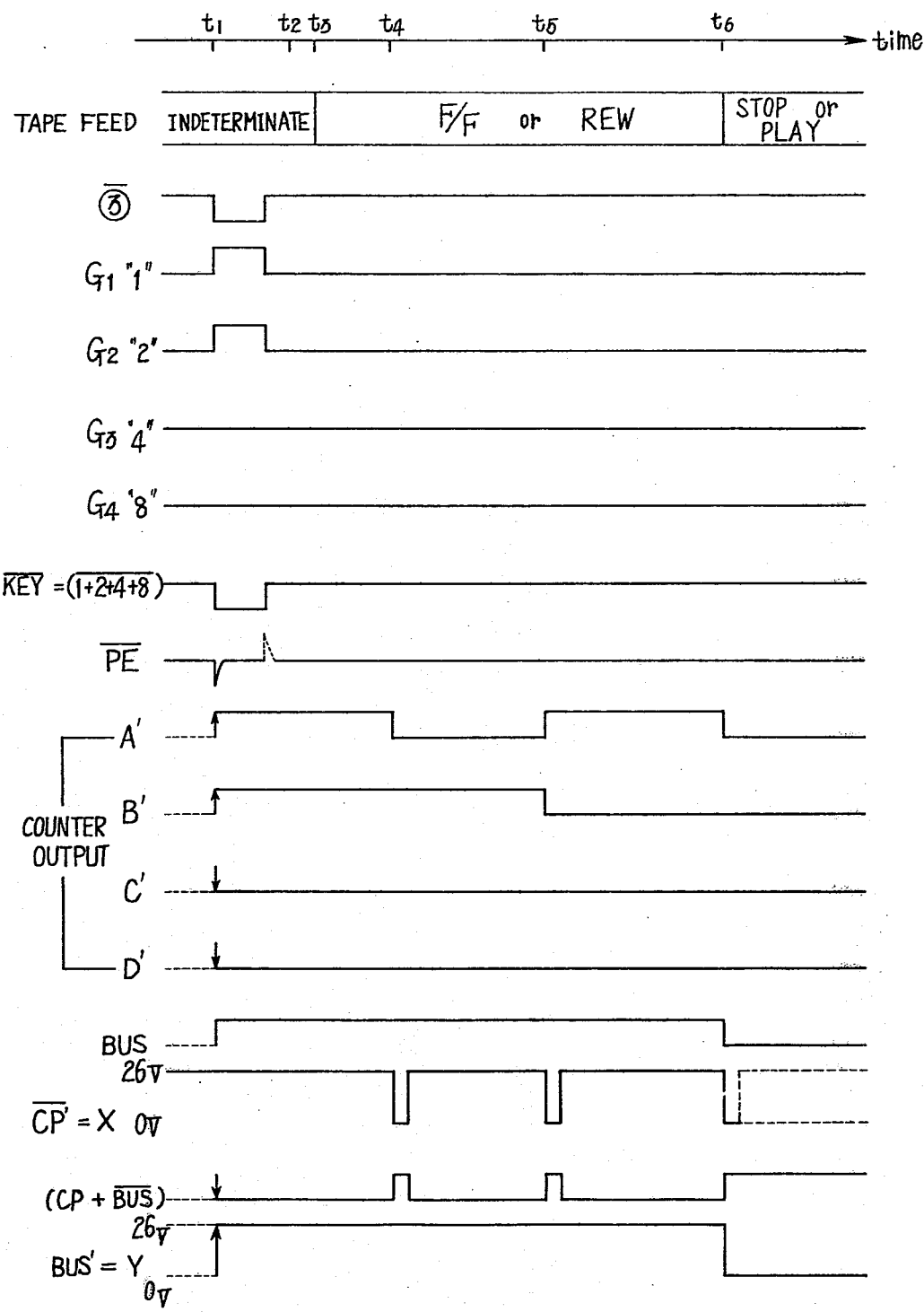
FIG. 3 is a time chart for the purpose of explanation of the operation of the automatic program locator of FIG. 1.

The operation mode of the automatic program locating system of the present invention will be fully understood from the following description when considered in conjunction with the FIG. 3 time chart.

The following description relates to the operation mode when the head of the third program counted from the now reproduced program is desired to be positioned at the playback head. When the numeral key ③ on the key board panel 20 is depressed at the time $t_1$, the presettable decade down counter 18 stores the numeral information "three." The APL switch 243 is manually turned ON at the time $t_2$ and the fast forward switch is manually locked at the time $t_3$ and hence the sensing head 12 is forced into contact with the tape. The indication unit 26 indicates "3" since the presettable decade down counter 18 outputs "three" at the count output terminals A', B', C' and D' thereof. When the sensing head 12 reaches a first silence portion between the recorded programs on the tape at the time $t_4$, the output signal X from the recorded passage detection circuit 16 becomes low and hence a pulse ($\overline{CP}$ + BUS) is applied to the presettable decade down counter 18, the count of which is decremented one. The indication at the indication unit 26 is changed to 2. Similarly, when the sensing head 12 reaches a second silence portion at the time $t_5$, the count of the presettable decade down counter 18 is decremented one and hence the indication unit 26 indicates 1. When the sensing head 12 reaches a third silence portion at the time $t_6$, the count of the presettable decade down counter 18 becomes "zero." The BUS signal changes to its low level and hence the indication on the indication unit 26 is extinguished to indicate that the program head positioning operation is completed. At the same time the output signal BUS' of the second interface 19 reaches its low level and, therefore, the plunger 248 is enabled to shift the operation mode of the tape deck to its stop state or the normal playback state.

The invention being thus described, it will be obvious that the same way be varied in many ways. Such variations are not to be regarded as a departure from the spirit and scope of the invention, and all such modifications are intended to be included within the scope of the following claims.

What is claimed is:

1. An automatic program locating system for tape reproduction systems comprising:
    a. a sensing head in physical contact with a tape when the tape reproduction system is in the fast forward or rewind drive mode;
    b. recorded passage detection circuit means connected to receive signals from the sensing head for generating a silence detection signal when the sensing head reaches a silence portion between recorded programs;
    c. down counter means which counts down one count in response to each occurence of a silence detection signal;
    d. key input means for introducing a desired number into the down counter;
    e. count output detection circuit means for generating a control signal when the down counter counts from said desired number down to zero; and
    f. shifting means for shifting the operational states of the tape reproduction system upon receiving the control signal.

2. The automatic program locating system for tape reproduction systems of Claim 1 wherein the down counter is a presettable decade down counter and the desired number is introduced by a binary-coded decimal notation through a converter.

3. The automatic program locating system for tape reproduction systems of claim 1 wherein the shifting means comprises;
    a. a plunger for shifting the operational states of the tape reproduction system; and
    b. a plunger activating circuit for activating the plunger upon receiving the control signal.

4. The automatic program locating system for tape reproduction systems of claim 1 wherein the operational states of the tape reproduction system are shifted to its stop state upon receiving the control signal.

5. The automatic program locating system for tape reproduction systems of claim 1 wherein the operational states of the tape reproduction system are shifted to its normal playback state upon receiving the control signal.

6. The automatic program locating system for tape reproduction systems of claim 1 further comprising an inhibit gate of which input terminals are connected to receive the silence detection signal and the control signal, and of which an output terminal is connected with the down count input terminal of the down counter, thereby preventing erroneous introduction of a signal to the down counter.

7. The automatic program locating system for tape reproduction systems of claim 1 further comprising:
    a. an indication unit for indicating the contents of the down counter; and
    b. a decoder for decoding the contents of the down counter to a suitable form for the indication unit.

8. The automatic program locating system for tape reproduction systems of claim 7 wherein the decoder includes a blanking input terminal connected to receive the control signal, thereby extinguishing the indication on the indication unit when the count of the down counter is zero.

9. The automatic program locating system for tape reproduction systems of claim 1 further comprising a clear key for resetting the contents of the down counter.

10. The automatic program locating system for tape reproduction systems of claim 1 further comprising an auto-clear circuit for resetting the contents of the down counter upon throw of a power switch of the tape reproduction system.

* * * * *